May 13, 1924.
E. V. CROWELL ET AL
1,493,522
AEROPLANE WING CONSTRUCTION
Filed March 10, 1922
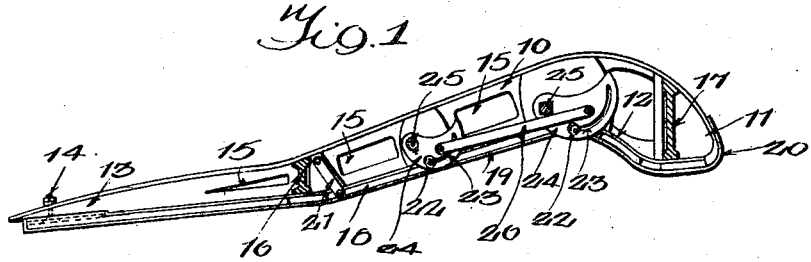
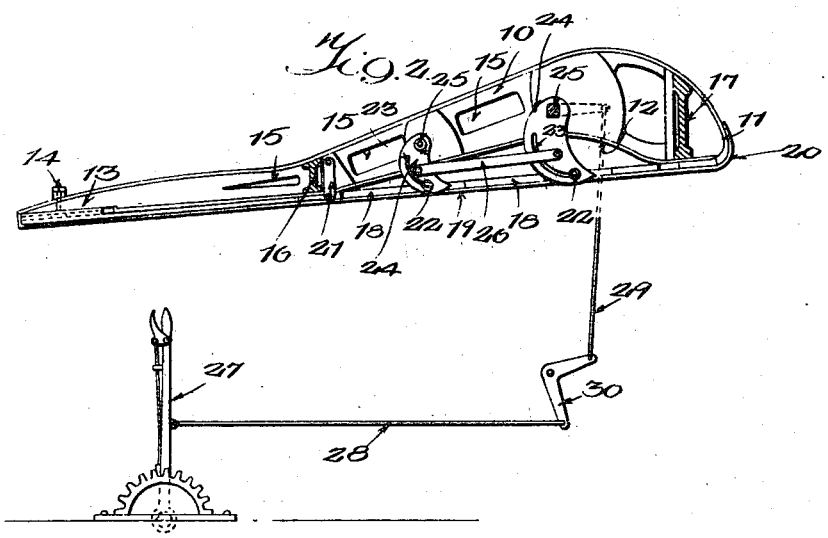
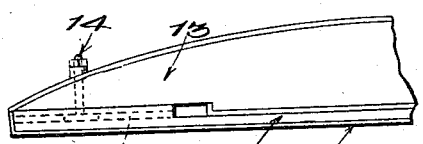
WITNESSES
INVENTOR
E. V. CROWELL,
W. HAWKINS,
BY
ATTORNEYS Patented May 13, 1924.

1,493,522

UNITED STATES PATENT OFFICE.

ERD V. CROWELL AND WHITEMAN HAWKINS, OF TULSA, OKLAHOMA.

AEROPLANE-WING CONSTRUCTION.

Application filed March 10, 1922. Serial No. 542,764.

*To all whom it may concern:*

Be it known that we, ERD V. CROWELL and WHITEMAN HAWKINS, citizens of the United States, and residents of Tulsa, in the county of Tulsa and State of Oklahoma, have invented certain new and useful Improvements in Aeroplane-Wing Constructions, of which the following is a specification.

Our present invention relates generally to the wing construction of aeroplanes, and more particularly to means providing for a change in the wing curve of aeroplanes at the will, and under the control of, the operator. The term wing-curve is well known in aerodynamics, having reference to the cross section of an aeroplane wing, and particularly the form or contour of the lower surface of the wing.

It is a well known fact that among the qualities necessary in a commercial aeroplane, the two most important or outstanding are first, its ability to take the air from, and land within, a confined space, coupled with horizontal stability at low speeds, with a useful load,—and second, extreme speed with minimum power consumption. These two qualities have been found to require materially different wing curves, and in fact the wing curve plays the greatest part in determining the extent to which these two necessary qualities exist. It is the common practice in wing construction at the present time to provide a wing having a curvature resembling to the greatest possible extent those curvatures necessary for the two qualities outlined. This practice results in a wing without extreme lifting power and likewise without extreme speed, and our primary object in the present instance is to provide in one construction for both extreme lift and extreme speed.

With the present construction of aerofoils speed indicates high power per load carried; the more load carried per horse power the lower the maximum speed, and, while this will remain true for any aerofoil construction, yet by providing the "variable wing curve," the load carried will not have such a direct bearing on the performance ability of the aeroplane. This has been aerodynamically proven out, where experimental results with wings of the usual type show, that aerofoils gain their high speed by a wing profile of one type and their high lift qualities from a distinctively different type. In other words, an aerofoil for load carrying is unsuited for high speed, and vice versa,—the wing capacity for high lift as well as high speed is determined by its aerodynamic characteristics, which are in turn, determined by "wing curvature," as herein defined.

It is essential that the landing speed of the aeroplane be sufficiently slow to permit safe landings, and minimum rate of climb must be sufficient for getting out of small landing fields. The higher the landing speed the more expert piloting required and the larger the landing field. The landing speed determines the minimum as well as the maximum speed. The same qualities of an aerofoil that determine the rate of climb or "lift" also determine the load carried per horse power, at any fixed speed. Thus the utility as well as the safety of an aeroplane are determined, to a great extent, by the efficiency of its aerofoils as measured by those qualities that make for "high lift" and "high speed."

Wing curvature is a highly scientific development, and the principal determining factor in performance ability. Airplane performance depends on five basic factors:—pounds per square foot,—pounds per horse power,—fineness,—engine propeller factor,—and wing-profile. Of these several factors, wing-profile (wing curve) is of paramount importance, and being essentially a structural element, it permits of ready application and full enjoyment of the invention herein described.

It has been found in practice that a thick or highly cambered wing has a larger lift per unit of surface than a less cambered or thinner wing, although the highly cambered wing has a disadvantage in that the resistance to passage through air at small angles and at small values of lift is large. It has been the common practice to compromise between these two extremes of wing design, resulting in a moderately efficient wing. As an example of this procedure the U. S. A. 27 wing section is cited, claimed to be the best overall efficient aerofoil so far developed. The U. S. A. 27 wing section is a compromise between an extreme lift wing and extreme speed wing,—its speed and lift could be greatly improved by providing a variable wing curve, whereby the curve for extreme lift and extreme speed can be embodied integrally in one construction.

Aerodynamically, a monoplane wing is much more efficient than the biplane or triplane wing, and the invention, herein described, permits of easy application to the monoplane type of structure;—where the structural advantages gained by reduction of area together with smaller wing-spread makes the application of the "variable wing curve" attractive and mechanically simple. The monoplane wings, being generally of a thick wing section, having a deep spar depth, in which the bridge structure can be enclosed, reducing head resistance to a minimum, and equipped with the "variable curve wing," for efficiency, promises startling results.

Stress analysis of the distribution of the load over wing tips has direct effect on the design of aerofoils, especially the cantilever monoplane type. It is a well known fact that, load per inch run of wing, drops off in proximity of wing tip. Study of pressure distribution along model wings was made in the National Physical Laboratory, and led to the conclusion that distribution of the load over a wing tip is practically independent of the "plan form" of the wing. The necessity of taking this drop into account in strength provisions was recognized long ago, and several approximate methods were in use. This only serves to emphasize the applicability of the "variable curve wing" to the monoplane type of structure, mechanically termed the cantilever type of wings;—where the wings have a very large wing-thickness and wing-chord at their roots, whence they taper considerably toward the top and wing tips, both in depth and chord. Thus the features, inherent to the cantilever monoplane wing, permit of easy application of the "variable wing curve",—providing high lift as well as high speed features in the wing at the point where they are most efficient and most demanded, as the wing curvature can be lessened as the proximity of the wing tips are approached without impairing the efficiency and greatly simplifying the mechanical details.

Numerous attempts have been made to increase the efficiency of the aerofoil by providing the variable camber or the variable angle of incidence features, both of which are of a very secondary importance to performance ability as compared with the "variable wing curve", as herein provided.

The airplane never makes a flight without the aerofoils being called upon for "lift" and "speed" both of which are functions of "drag", and determined by the profile characteristics of the aerofoil. Aerodynamic experiment as well as practice has shown that the "drag" of an aerofoil can be considered as composed of two parts:—drag due to the section proper, independent of the "plan form" of the aerofoil, and "induced drag", which depends on the "plan form" of the aerofoil and is a parabolic function of the lift. It is one of the prime objects of the invention herein described to provide means for altering the profile characteristics, while in flight, whereby the ratio of lift to drag may be varied.

The object of every airplane is to give high performance, the first requirement of which is flexibility of control. The only effect of a change is "wing curve" on the performance is through a change in the efficiency of the aerofoils; for and as the desired performance may be: speed, lift, or static longitudinal stability. The complete control of the maneuvers must be at all times at the disposal of the operator by positive control system which are, as far as possible, independent of the propelling apparatus.

In the present method of airplane construction the directional controlling surfaces, as represented by the rudder and elevators, are directly in the slipstream (in line with the propeller thrust) and much less effective in a glide than in power flight. Speed ahead is essential to the sustenation of the airplane and for any given machine at any particular altitude there is a minimum "critical" speed below which the plane is unable to support itself and will fall out of control for such a distance as is necessary to bring it up to its minimum flying speed. In all airplanes in use at the present time it has been found necessary, to permit of proper maneuvering when making a landing or taking off, to provide an excess of control surfaces,—by which we mean the directional and elevating controls as represented by the rudders and elevators are of such ample surface that they are effective at speeds below those at which the airplane is capable of supporting itself. It is therefore possible for the operator to manipulate the controls so as to decrease the airplane's speed down to such a point where his control ceases, due to the lack of sufficient lift developed by the wings. One of the principal reasons for the sluggish response of the airplane to the controlling surfaces at low speeds is because they are in direct line with the propeller thrust, and are never made operative except at an expenditure of a part of the propelling energy. It would be a great advantage to be able to reduce the area of the controlling surfaces, and provide instead, means for directional control that is not dependent for its operation upon a direct pull on the propeller. This obviates one of the advantages of the invention herein described, whereby it is possible to vary the wing curvature in any wing separately or any combination of wings simultaneously, similarly, or differentially, thereby varying the ratio of lift to drag on either side independently;—rendering the directional movement more responsive to the operation of the controlling surfaces. Thus by providing this differential adjustment of the aerofoils the airplane can be maneuvered in smaller areas, and the wing profile answering the requirement for maximum static longitudinal stability is momentarily at the command of the operator.

In a wing construction providing for extreme lift and maximum stability at low speeds with a useful load carrying with it the ability to take the air from, or land within a confined space, it is necessary that the wing be deeply concaved adjacent to its leading edge upon the lower surface, and this form of wing curve sets up considerable resistance to speed, commonly referred to as "drag." On the other hand, a wing designed for speed requires a substantially flat lower surface, and it is our purpose to permit of answering these requirements by a wing having a deeply concaved lower surface, provided with a flexible wing cover; operated by mechanisms within the wing,—which may cause the flexible wing cover to be straightened out into a substantially flat line for the purpose of eliminating the drag and thus permitting of maximum speed with minimum power.

It becomes quite obvious, that with other things equal, the concaved wing curve requires increase of horse power and area of wing surface in order to accomplish speed, whereas, on the other hand the straight line speed wing can lift only a minimum load,— and that the procedure of compromising between these two extreme types of aerofoils, and then piling on horse power to provide the necessary performance ability is a decided drawback in the commercial machine,—on account of increased first cost, subsequent maintenance, and mainly performance ability.

In proposing our present construction therefore, we seek to avoid the disadvantages of the ordinary practice and produce the desired results in a simple, economical and efficient manner.

For the purposes of our invention we propose a wing web or rib, of which each wing may include any number, provided with means contained within the wing and controlled by the operator, whereby the lower edge may be flexed from a substantially straight line into a concavely curved line and vice versa.

In the accompanying drawing which illustrates our invention and forms a part of this specification, Figure 1 is a side elevation of our improved wing web or rib showing the same in position for maximum lift and minimum speed, Figure 2 is a similar view showing the position of minimum lift and maximum speed, and Figure 3 is an enlarged side view of the rear portion thereof.

Referring now to these figures our invention proposes an aerofoil including ribs or webs, the body 10 of each of which is rigid and has a decided arch adjacent to its forward end 11 producing a deep concave 12 upon its undersurface, the entire body tapering from its front end 11 to its rear end 13, the latter of which is provided with a rigid bolt 14 whose depending T-head forms a guide in the manner and for the purpose to be presently described.

Each rib or web 10 which may have a lengthwise series of longitudinally slotted openings 15, provides as usual for the reception of wing beams 16 and 17 which determine the length of the wing and extend transversely through a number of ribs or webs 10 in the finished wing structure depending in number upon the desired length.

According to our invention each rib or web is provided along its lower edge with a series of jointed strips 18 whose beveled ends are in abutting relation, and the rear end of the rearmost strip of which is longitudinally slotted as at 18ª to receive the depending T-head of bolt 14.

The several strips 18 are each securely fastened to a flexible strap 19, the forward end 20 of which is turned upwardly around, and secured to the forward end 11 of the rigid body of the web or rib. This strap 19 is preferably formed of a suitable light flexible metal which, in view of the joints between the several strips 18 attached thereto, is movable into the concave 12 of the body 10, against and parallel with the lower edge of the body, as seen in Figure 1, and is also shiftable into a straight line from the front to the rear of the body 10 across the concave 12 as shown in Figure 2.

For this purpose swinging side links 21 are pivotally attached at their upper ends to opposite sides of the web or rib 10 at the rear of its concave 12 and are pivotally attached at their lower ends to certain of the strips 18, and at spaced points of that portion of the flexible member formed by the strips 18 and their connecting strap 19 opposite the concave 12 of the rigid body of the rib or web, the strips 18 have laterally extending pins 22 projecting through the arcuate slots 23 of cam levers 24, these levers being pivotally mounted at 25 to the rigid body 10 and being connected by a link or connecting rod 26 so as to constrain the same to simultaneous movement. Shifting of these cam members 24 in one direction serves to draw the pins 22 upwardly in view of the eccentricity of the slots 23 in respect to the pivots 25, as shown in Figure 1.

For the purpose of actuating the movable parts, the pivots of the forward cam levers may be in the nature of a squared shaft, as shown, so that partial rotation of this shaft from the operator's lever, indicated at 27, through connecting rods 28 and 29 and a bell-crank 30, will have the effect of shifting the cam levers between the two positions of Figures 1 and 2.

In operation, the operator is in complete control of the "wing curvature," as means are provided for readily shifting the parts into the position for high lift at low speeds when taking off or landing,—and then shifting them into the position for high speed with minimum resistance when straightened out in horizontal flight after the desired altitude has been gained. There is thus provided means for varying the ratio of "lift" to "drag," with the consequent increased maneuverability which may be enjoyed in the form of increased distance traveled or increased load carried for a given expenditure of horse power. The invention provides means for compensating for variation in load, variation in speed or both.

The aerofoils can be thrown into a deep curve, known as the "high lift" curve enabling the aeroplane to climb at a steep angle;—or they may be streamlined,—giving the "high speed" curve; cutting head resistance to a minimum. The curvature can be applied to any wing separately or any combination of parts simultaneously, similarly, or differentially. The resultant flexibility of control will add greatly to the utility and safety of the aeroplane.

It is thus obvious that as the cam levers are shifted from the position of Figure 1 for maximum stability and lifting power, to the position of Figure 2 for maximum speed, the rear end of the strap 19 recedes rearwardly as it assumes a straight line, and that in the opposite movement, namely to the position of Figure 1 it is drawn forwardly in order to give the required extra length necessary to follow the curvature of the concave underportion of the rib.

By means of our invention, and in view of the fact that the material of which the wing surface is formed is flexible in its nature and capable of attachment to the strap 19 and the strips 18, it is quite obvious that the desired change of wing curve may be readily effected in such manner as to enable the operator to shift the parts into the position shown in Figure 1 when rising in the air or landing and then shift the parts to the speed position of Figure 2 when the machine is straightened out in horizontal flight.

Our invention thus answers the two major requirements as far as wing structure is concerned, without increasing wing area and likewise without increasing motive power.

It is obvious that many changes may be made, and as to the flexible metal strap 19 joining the strips 18, entire dependence need not be placed upon such a strap but the strips 18 may be hingedly connected at their ends to one another if it is so desired or if it is found in practice that the constant flexure or bending is too great for the metal strap alone to be depended upon. Furthermore although we have shown and described certain means including a lever 27 for actuating the cam levers, other means may be utilized should it prove desirable or necessary.

We claim:

1. A web for aeroplane wings comprising a rigid body having its lower edge provided with a concavely curved portion, and a flexible strip extending continuously along said edge having a rear lengthwise grooved sliding portion, and a forward portion yieldable into and out of the said concaved portion, said body having a vertical headed guide member at its rear end extending into the groove of the rear end of the rear sliding portion of said flexible strip whereby the latter is guided in its movement.

2. A web for aeroplane wings comprising a rigid body having its lower edge provided with a concavely curved portion, a pair of cam levers connected to one another and pivoted to the said body and provided with eccentric slots, a flexible strip extending along the lower edge of the body and having outstanding pins projecting into the slots of said cam levers for shifting movement thereby into and out of the concaved portion, and means for moving said cam levers in opposite directions including a cam shaft upon which one of said levers is directly mounted and fixed.

3. A web for aeroplane wings comprising a rigid body having its lower edge provided with a concavely curved portion, a pair of cam levers connected to one another and pivoted to the said body and provided with eccentric slots, a flexible strip extending along the lower edge of the body and having outstanding pins projecting into the slots of said cam levers for shifting movement thereby into and out of the concaved portion, means for moving said cam levers in opposite directions including a control lever having means for locking the same in adjusted position, a cam shaft on which one of the cam levers is directly fixed, and connections between said control lever and said cam shaft, said flexible strip being secured at its forward end to the forward end of the web and having a slotted rear end, and means at the rear end of the web entering the slot of the rear end of the strip to guide the latter in its movement.

ERD. V. CROWELL.
WHITEMAN HAWKINS.